United States Patent
Hashizume et al.

(10) Patent No.: US 6,961,215 B2
(45) Date of Patent: Nov. 1, 2005

(54) DISK DRIVE CLAMP FOR CLAMPING DISKS TO SPINDLE MOTOR WITH ELASTIC PORTION AND COATED CONTACT PORTION

(75) Inventors: Masataka Hashizume, Fujisawa (JP); Ryohsuke Shinohara, Isehara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 78 days.

(21) Appl. No.: 10/435,905

(22) Filed: May 12, 2003

(65) Prior Publication Data

US 2003/0214752 A1 Nov. 20, 2003

(30) Foreign Application Priority Data

May 16, 2002 (JP) .................................... 2002-141743

(51) Int. Cl.[7] ............................................. G11B 17/028
(52) U.S. Cl. .................................................. 360/99.12
(58) Field of Search ........................... 360/98.08, 99.12

(56) References Cited

U.S. PATENT DOCUMENTS 4,945,432 A * 7/1990 Matsudaira et al. ..... 360/98.08
6,462,903 B1 * 10/2002 Yamada et al. .......... 360/99.12

FOREIGN PATENT DOCUMENTS

| GB | 2158633 A | * 11/1985 | ........... G11B/17/28 |
| JP | 62257615 A | * 11/1987 | ........... G11B/05/72 |

* cited by examiner

Primary Examiner—Craig A. Renner
(74) Attorney, Agent, or Firm—Bracewell & Giuliani LLP (57) ABSTRACT

A disk drive device includes a recording medium, a head slider having a head element for recording data on the recording medium and for reading data recorded on the recording medium, a spindle motor for rotating the recording medium, and a clamp for applying a pressing force to the recording medium to fasten the recording medium to the spindle motor. The disk drive device has a feature in which a film body formed from a material which is more pliable than a material forming the clamp is interposed between the clamp and the recording medium. Even if the clamp does not have a high flatness, the film body absorbs irregularities of the clamp. Thus, it is possible to fasten the recording medium with the clamp while apparently keeping flatness.

7 Claims, 6 Drawing Sheets

Prior Art

FIG. 8

DISK DRIVE CLAMP FOR CLAMPING DISKS TO SPINDLE MOTOR WITH ELASTIC PORTION AND COATED CONTACT PORTION

RELATED PATENT APPLICATION

This application claims priority to Japanese Patent Application No. JP2002-141743 (Hitachi Global Storage Technologies Docket No. JP920010388JP1), filed on May 16, 2002, and entitled "Disk Drive Device and Clamp".

BACKGROUND OF THE INVENTION

1. Technical Field

The present invention relates to a clamp method of a disk shaped recording medium to a spindle motor in a disk drive device such as a hard disk drive and, more specifically, to a clamp method in which warpage does not occur in a disk shaped recording medium.

2. Description of the Related Art

In a hard disk drive (hereinafter referred to as an HDD), which is most general data storage means for a computer, has a structure in which a single disk shaped recording medium or a plurality of disk shaped recording media are arranged coaxially and in which the disk shaped recording medium or media are driven by a spindle motor. Read and write operations of data are carried out by a magnetic head provided so as to face the disk shaped recording medium, and the magnetic head is driven by an actuator, which is a voice coil motor (hereinafter referred to as a VCM) in general. The disk shaped recording medium or media, the magnetic head, and the actuator are contained in a case which is called an enclosure case.

The base has a circuit board fastened on a back surface thereof. The circuit board is mounted with elements for controlling the spindle motor, the VCM, and the like. The circuit board is provided with an interface cable connector for establishing a connection with a computer apparatus which serves as a host. At a position on a far side of the interface cable connector, a preamplifier connector is provided. The reason why the preamplifier connector is located on the far side of the interface cable connector as described above is that a wiring distance between the preamplifier connector and the preamplifier can be shortened. On the other hand, the reason why the interface cable connector is located on the same side of the spindle motor is that the above described arrangement is thought to be best based on electrical constraints such as an intensity of a signal, digital or analog, and a noise, along a flow of the signal viewed from the interface cable connector, and based on geometrical constraints such as a position and a size of the VCM included in the enclosure case.

Heretofore, by improving a flatness of a contact surface between a disk shaped recording medium and a clamp, the above described problem has been coped with. However, in view of a production cost of a clamp, there is a limit to significantly improving the flatness.

SUMMARY OF THE INVENTION

Accordingly, it is an object of the present invention to provide a clamp by which warpage occurring in a magnetic disk can be reduced without significantly improving a flatness of the magnetic disk. Moreover, it is another object of the present invention to provide a disk drive device in which a disk shaped recording medium is fastened with such a clamp.

A clamp is generally formed of metal such as stainless steel. The inventor of the present invention found that it is possible to reduce warpage occurring in a disk shaped recording medium by interposing a film body formed from a pliable material, such as rubber, between the clamp and a disk shaped recording medium. It is sufficient that this film body is provided at least at a portion of the clamp which is brought into contact with the disk shaped recording medium.

The present invention is based on the above described knowledge. The present invention includes a disk shaped recording medium; a head slider which has a head element for recording data on the disk shaped recording medium and for reading data recorded on the disk shaped recording medium; a spindle motor for carrying out rotation drive of the disk shaped recording medium; and a clamp for applying a pressing force to the disk shaped recording medium to fasten the disk shaped recording medium to the spindle motor. A disk drive device of the present invention has a feature in which a film body formed from a material which is more pliable than a material forming the clamp is interposed between the clamp and the disk shaped recording medium.

In the disk drive device of the present invention, even if the clamp does not have a high flatness, the film body absorbs irregularities of the clamp. Thus, it is possible to fasten the disk shaped recording medium with the clamp while apparently keeping flatness.

In the disk drive device of the present invention, the film body is preferably formed from a material which has a lower friction coefficient with respect to the disk shaped recording medium than the material forming the clamp. It is assumed that there are local irregularities on the clamp. In this case, if it is assumed that the clamp is brought into contact directly with the disk shaped recording medium to press the disk shaped recording medium, the local irregularities produce stress concentration, and thus a considerable frictional force is produced between the clamp and the disk shaped recording medium. The stress concentration and the frictional force cause warpage which occurs in the disk shaped recording medium. Whereas, by forming the film body from a material which has a low friction coefficient with respect to the disk shaped recording medium than the material forming the clamp, the frictional force is reduced and thus occurrence of the warpage can be reduced.

The film body can exert an effect thereof as far as the film body is interposed between the disk shaped recording medium and the clamp. Accordingly, a method of interposing the film body is not regarded. However, in order to fix an attachment position of the film body, it is preferred that the film body is adhered to a predetermined position of the disk shaped recording medium or the clamp, particularly the clamp, from a viewpoint of working efficiency.

As the material forming the film body, fluorocarbon resin is preferable. The film body is contained in the disk drive device. Owing to aging caused by environmental temperature, a certain type of rubber sometimes produces a gas component which is not preferable for a disk drive device. An investigation by the inventor of the present invention has proved that fluorocarbon resin does not produce such a gas component. Therefore, in the present invention, it is recommended to use fluorocarbon resin as a material of the film body. As a more specific form, as shown also in the preferred embodiment described later, it is desired to use fluorocarbon resin containing fluorinated ethylene propylene copolymer (FEP).

As described above, FEP is preferable as fluorocarbon resin. On the other hand, the clamp used in the disk drive device fastens the disk shaped recording medium to the spindle motor by an elastic force or a spring force thereof in general. Therefore, the clamp has an elastic portion for producing a predetermined elastic force and a pressing portion for pressing the disk shaped recording medium. Here, the pressing portion is provided so as to extend from the elastic portion. It is the pressing portion that directly concerns fastening of the disk shaped recording medium. Accordingly, it is sufficient to form FEP on at lease this pressing portion.

In order to realize the foregoing, the present invention provides a disk drive device including a disk shaped recording medium; a spindle motor for carrying out rotation drive of the disk shaped recording medium which is mounted on a hub of the spindle motor; and a clamp for fastening the disk shaped recording medium to the spindle motor. Here, the clamp has an elastic portion for producing a predetermined elastic force and a pressing portion for pressing the disk shaped recording medium. The pressing portion is provided so as to extend from the elastic portion. Moreover, a coating layer containing FEP is formed on at least a surface of the pressing portion which faces the disk shaped recording medium.

In the disk drive device of the present invention, there is obtained an effect of reducing warpage of the disk shaped recording medium in which a magnetic thin film is formed on a glass substrate surface. Warpage caused by the clamp becomes more eminent with decreasing thickness of the disk shaped recording medium. This is because a strength of the disk shaped recording medium becomes weak. Whereas, according to the present invention, even in a case of a disk shaped recording medium having a thickness as thin as 0.8 mm or less, the effect of reducing the warpage can be exerted.

As described above, it is preferred that FEP is used by being adhered to the clamp and formed thereon. In other words, the present invention is realized as a single clamp fastening a disk shaped recording medium to a spindle motor in a disk drive device. This clamp includes a clamp body formed of a round plate type spring body. The clamp body has a pressure applying portion for applying a pressing force to the disk shaped recording medium. Moreover, the clamp includes a coating layer containing FEP. The coating layer is formed on a surface of the pressure applying portion which faces the disk shaped recording medium.

A disk drive device has a predetermined thickness. Moreover, a spindle motor and a disk shaped recording medium are contained with a high density in a case of the disk drive device. Therefore, it is desired that a coating layer is as thin as possible. On the other hand, if the coating layer is too thin, there is a risk in which an effect of reducing warpage of the disk shaped recording medium can not be exerted. Whereas, FEP used in the present invention can exert a predetermined effect even if a thickness thereof is 25 μm or less as described later in the preferred embodiment. Depending on a coating method, the predetermined effect can be exerted even in a case of a coating layer having a thickness of 10 μm or less and, moreover, even in a about 5 μm.

Furthermore, the coating layer is desired to have a high flatness in order to exert an effect thereof as described later in the preferred embodiment. Therefore, it is recommended that the coating layer used in the present invention is formed to have a flatness of +/−5 μm or less.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF A PREFERRED EMBODIMENT

Hereinafter, the present invention will be described in detail based on an embodiment.

Figure 1:
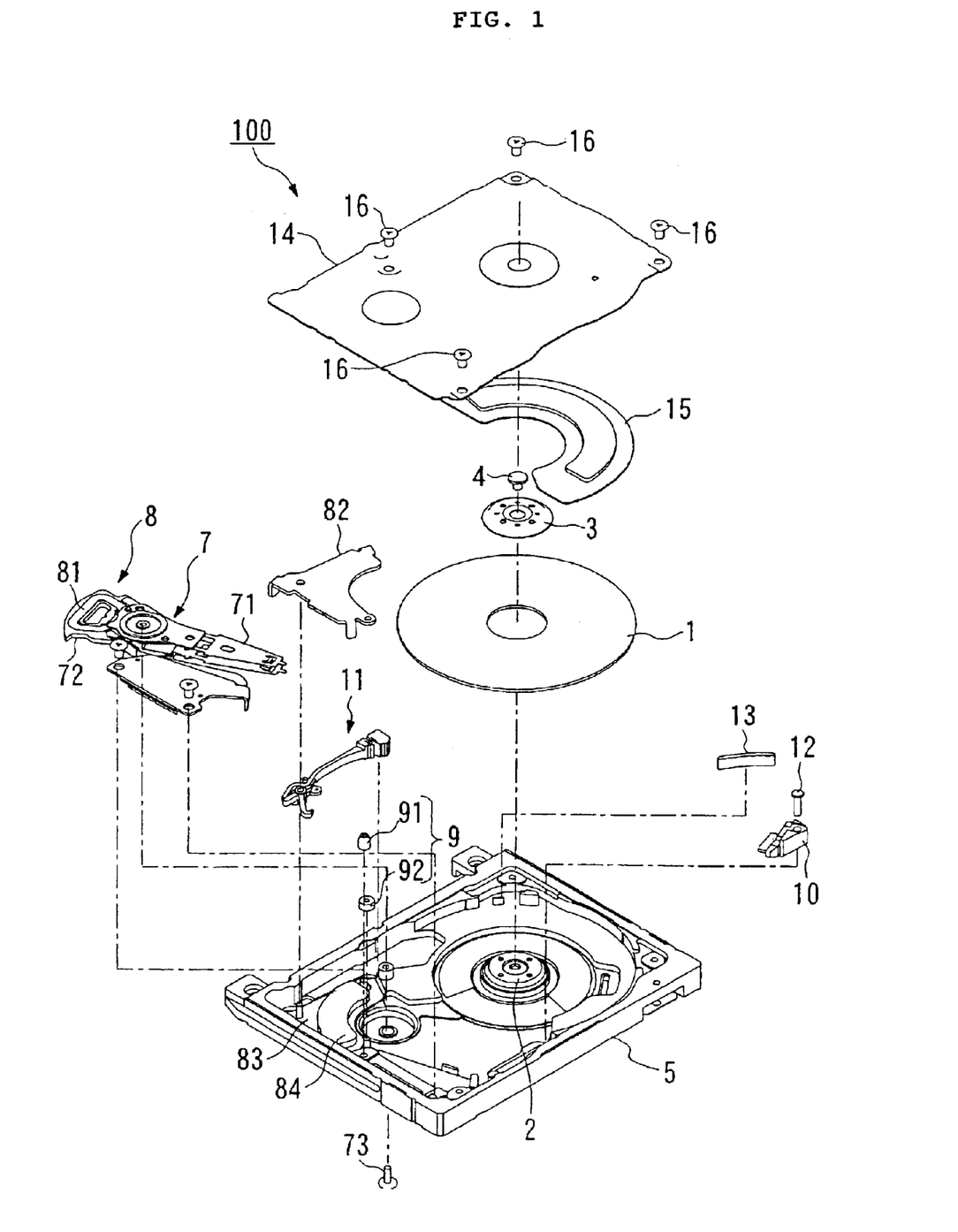
FIG. 1 is an exploded perspective view showing a structure of a hard disk drive according to an embodiment of the present invention.
Figure 2:
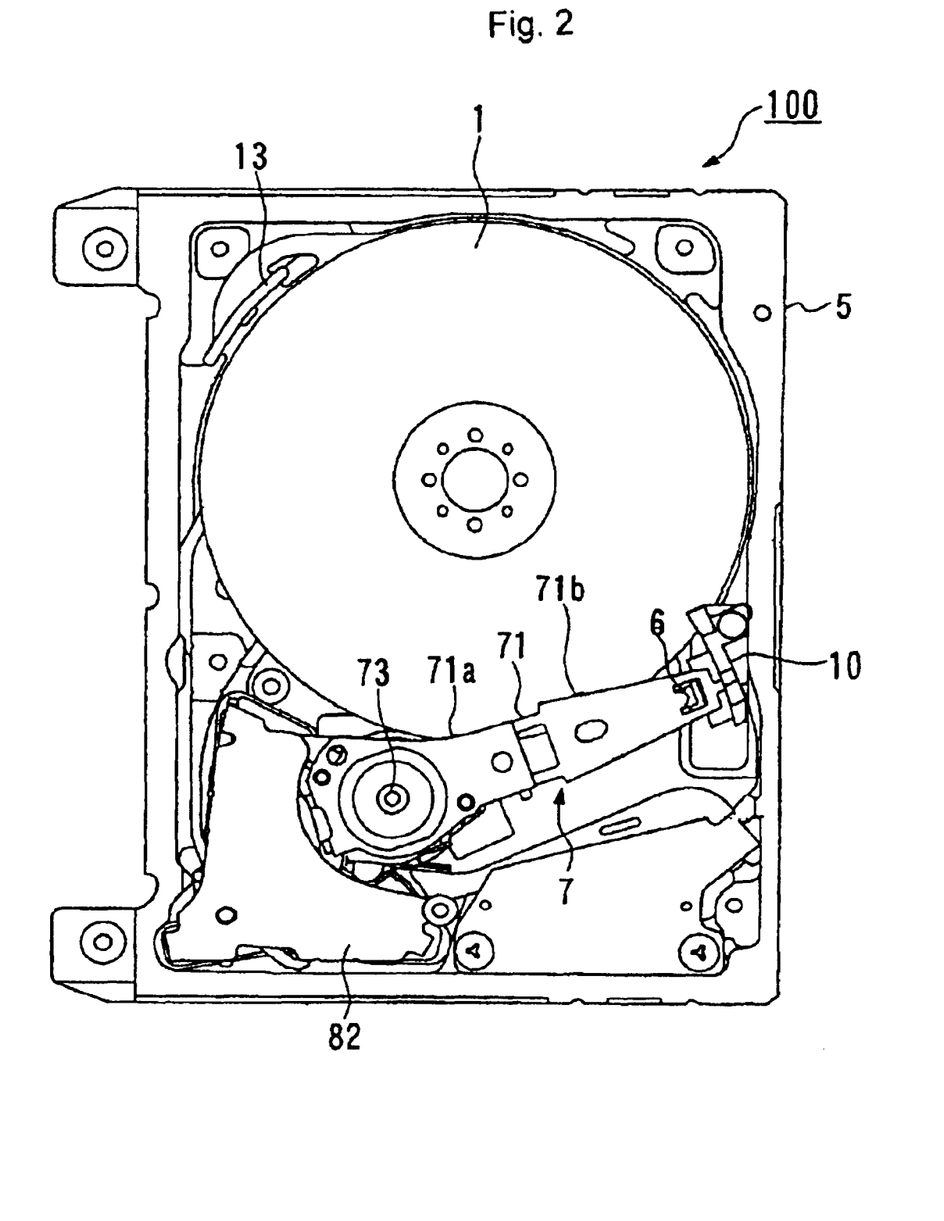
FIG. 2 is a plan view showing the structure of the hard disk drive according to the embodiment.

FIG. 1 is an exploded perspective view of a hard disk drive 100 as a disk drive device according to the embodiment of the present invention. FIG. 2 is a plan view of the hard disk drive 100. Note that FIG. 2 shows a state in which a top cover 14 is removed.

As shown in FIGS. 1 and 2, in a base 5 of a box shape, contained are a magnetic disk 1 being a data recording medium, a spindle motor 2 for carrying out rotation drive of the magnetic disk 1, an actuator 7 mounted with head sliders 6, a voice coil motor (VCM) 8 for carrying out swing drive of the actuator 7, a crash stop 9 for limiting a swing range of the actuator 7, a ramp block 10 provided at a shunt position for the actuator 7, an inertia latch mechanism 11 constituting an actuator lock mechanism, and the like. The hard disk drive 100 includes a load/unload mechanism for the actuator 7 and the actuator lock mechanism using the inertia latch mechanism 11. Thus, upon stoppage of an operation of the hard disk drive 100, the actuator 7 is unloaded to the shunt position. During a non-operation period of the hard disk drive 100, the actuator 7 is held at the shunt position. The ramp block 10 constitutes the load/unload mechanism as well as the actuator lock mechanism.

The magnetic disk 1 is fastened to a hub of the spindle motor 2 by use of a top clamp 3 and a screw 4. When the hard disk drive 100 is operating, the rotation drive of the magnetic disk 1 is carried out about a spindle shaft of the spindle motor 2. On the other hand, when the hard disk drive 100 is not operating, the rotation of the magnetic disk 1 is stopped (stationary). On a surface of the magnetic disk 1, tracks on which data and servo information are recorded are arranged concentrically. In the embodiment, the single magnetic disk 1 is installed. However, the number of magnetic disks may be more than one.

The actuator 7 has a head arm 71 and a coil arm 72. The actuator 7 is engaged with a swing shaft 73 so as to swing freely. Accordingly, the actuator 7 is provided so as to be capable of moving rotationally about the swing shaft 73. The head arm 71 and the coil arm 72 are arranged such that the head arm 71 and the coil arm 72 are opposed to each other interposing the swing shaft 73 therebetween. As shown in FIG. 2, the head arm 71 has a carriage arm 71a and a suspension arm 71b suspended from the carriage arm 71a. Moreover, the suspension arm 71b is mounted with the head sliders 6.

The head sliders 6 are attached to the head arm 71 so as to face top and under surfaces of the magnetic disk 1, respectively. The head sliders 6 are connected to a control unit by use of wires or the like (not shown). Each head slider 6 is provided with a head element (not shown) which records data from the control unit on a track on a surface of the magnetic disk 1 and which reads data recorded on a track to transfer the data to the control unit.

The VCM 8 is composed of a voice coil 81 mounted on an inner surface of the coil arm 72, top and under yokes 82 and 83, a permanent magnet (not shown) attached to an under surface of the top yoke 82, a permanent magnet 84 attached to a top surface of the under yoke 83, and the like. The voice coil 81 is supplied with a drive current from the control unit (not shown). The coil arm 72 is located in a space between the top and under yokes 82 and 83.

The crash stop 9 is provided in order to force the actuator 7 to stop swinging by abutting against the coil arm 72 when the VCM 8 runs away during the operation, thus preventing the actuator 7 from crashing into the spindle motor 2 or other mechanisms constituting the disk drive device. The crash stop 9 is composed of a pair of pins 91 and 92.

The ramp block 10 is fastened to the base 5 by use of a screw 12. Note that the actuator 7, the VCM 8, and the ramp block 10 constitute the load/unload mechanism.

The base 5 is provided with a circulation filter 13 for filtering air which circulates in the hard disk drive 100. The top cover 14 to which a breather filter 15 is attached is tightened by a screw 16, thus sealing the base 5 airtightly against an outside.

Figure 3:
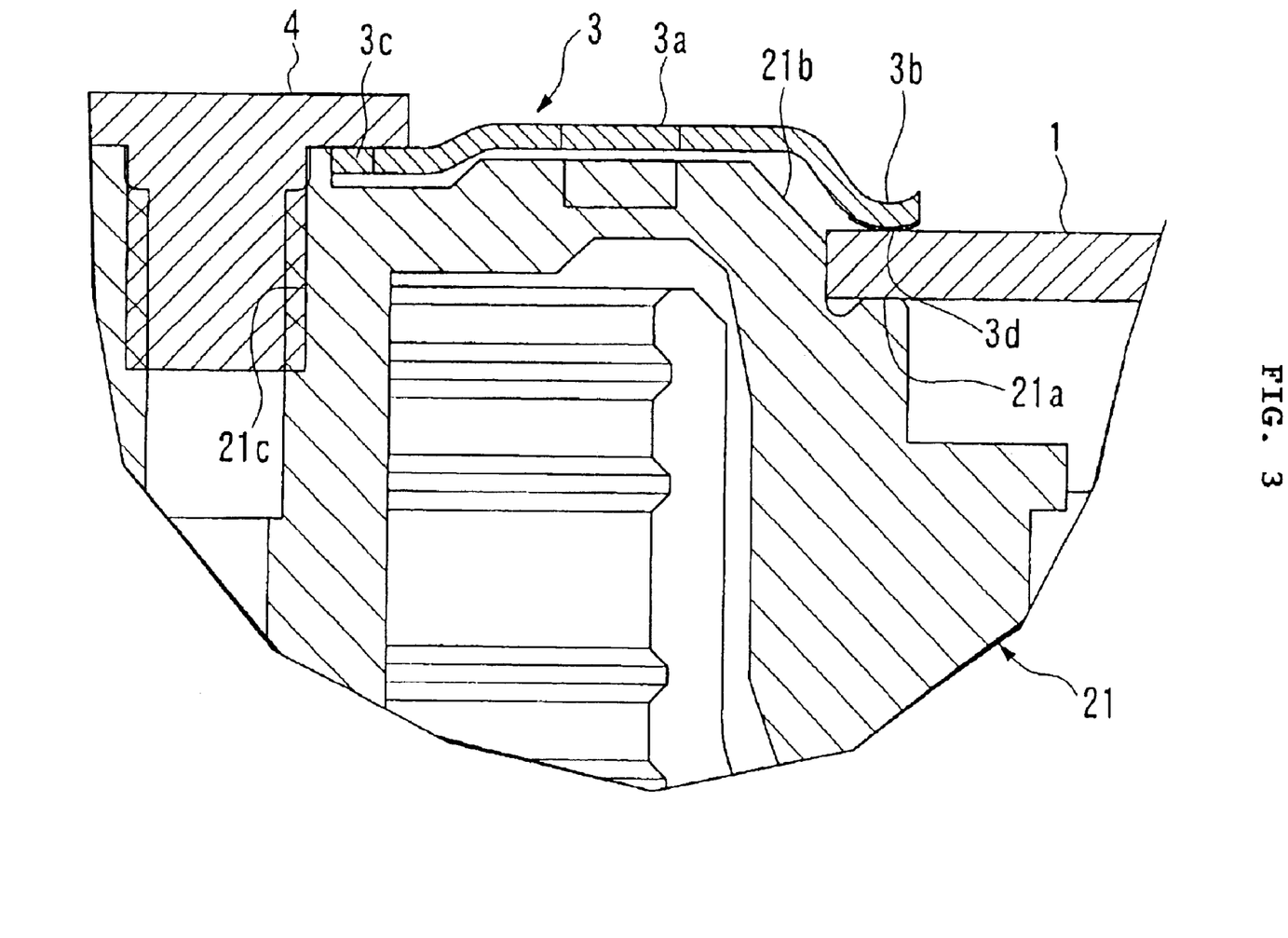
FIG. 3 is a cross sectional view showing a portion where a magnetic disk is fastened with a spindle.

FIG. 3 is a partial cross sectional view showing a state in which the magnetic disk 1 is fastened to the hub 21 of the spindle motor 2 by use of the top clamp 3 and the screw 4.

As shown in FIG. 3, in the hub 21 of the spindle motor 2, formed are a disk mounting surface 21a, a center 21b, and a screw hole 21c.

The top clamp 3 is formed of stainless steal, for example. The top clamp 3 has a centering hole 3c on a center thereof. The top clamp 3 includes an elastic portion 3a of a circular shape and a pressing portion 3b which is provided so as to extend from the elastic portion 3a, in this order from the near side to the centering hole 3c. Accordingly, the top clamp 3 can be regarded as a spring body of a circular shape in its entirety. On a surface of the pressing portion 3b which faces the magnetic disk 1, a coating layer 3d is formed.

In a state where the magnetic disk 1 is mounted on the disk mounting surface 21a of the spindle motor 2, the top clamp 3 is attached to the hub 21 and is also fastened by use of the screw 4. At this time, in the elastic portion 3a of the top clamp 3, an elastic force required for fastening the magnetic disk 1 is produced. The pressing portion 3b converts the elastic force produced in the elastic portion 3a into a force pressing the magnetic disk 1, thus fastening the magnetic disk 1 to the hub 21.

As described above, on the surface of the pressing portion 3b which faces the magnetic disk 1, the coating layer 3d is formed. This coating layer 3d is formed from a material which is more pliable than the top clamp 3. Specifically, the coating layer 3d is formed from fluorocarbon resin containing fluorinated ethylene propylene copolymer (FEP). This FEP (coefficient of kinetic friction=0.3) exhibits a low friction coefficient compared to the stainless steel (coefficient of kinetic friction=0.47) which forms the top clamp 3. Note that, in FIG. 3, the coating layer 3d is formed only on the surface of the pressing portion 3d which faces the magnetic disk 1. However, the coating layer 3d may be formed also on other portions of the top clamp 3.

Figure 4:
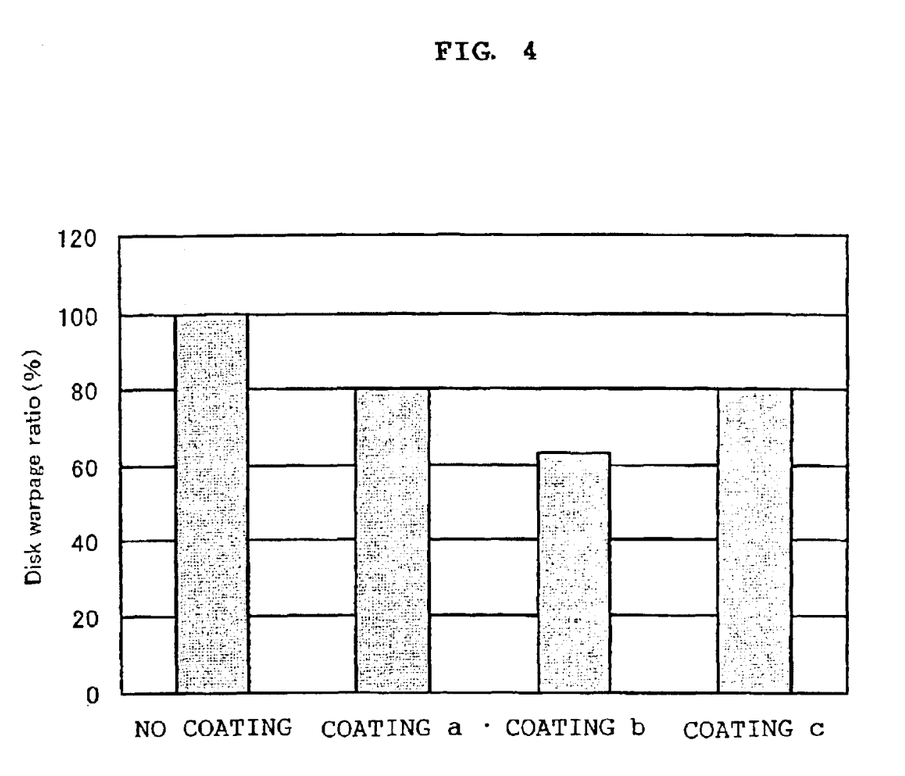
FIG. 4 is a view showing a result of measuring warpage of the magnetic disk, where a value of a top clamp on which a coating layer is not formed is 100.

In the embodiment, the coating layer 3d is formed by use of three different FEP coating methods. The three coating methods (Coating a to Coating c) are as shown below. Thus, warpage of the magnetic disk 1 was measured when the magnetic disk 1 was clamped with four types of top clamps 3 including a top clamp 3 on which the coating layer 3d is not formed. FIG. 4 shows a result (disk warpage ratio (%)) when a value of the top clamp 3 on which the coating layer 3d is not formed is set to 100. Note that a measurement point is at an innermost position in a data storage area of the magnetic disk 1.

Coating a: A top clamp 3 being an object to be coated is located on a flat plane, and then an organic medium containing FEP is applied thereto from above.

Minimum thickness: 10 μm

Thickness accuracy: +/−5 μm

Coating b: A top clamp 3 being an object to be coated and an organic medium containing FEP are put in a rotatable basket, and then the basket is rotated.

Minimum thickness: 3 μm

Thickness accuracy: +/−2 μm

Coating c: Powdery FEP is adhered to a top clamp 3 by use of static electricity. The used powder has a minimum grain diameter of 8 μm and a maximum grain diameter of 20 μm.

Minimum thickness: 20 μm

Thickness accuracy: depending on a grain diameter of the used powder

As shown in FIG. 4, compared to the top clamp 3 on which the coating layer 3d is not formed, the warpage of the magnetic disk 1 is reduced by more than 20 percent in the top clamps 3 to which FEP is applied (Coating a to Coating c). In a case of Coating b, it can be seen that a warpage reduction of almost 40 percent is achieved compared to the top clamp 3 on which the coating layer 3d is not formed. In Coating b, a thickness of the coating layer to be formed can be set to as thin as 5 μm or less, and the thickness accuracy is as high as +/−2 μm. From this point of view, Coating b is preferable for the present invention.

A mention will be made of two reasons why the warpage of the magnetic disk 1 is reduced by the presence of the coating layer 3d which is formed according to the embodiment.

Figure 5:
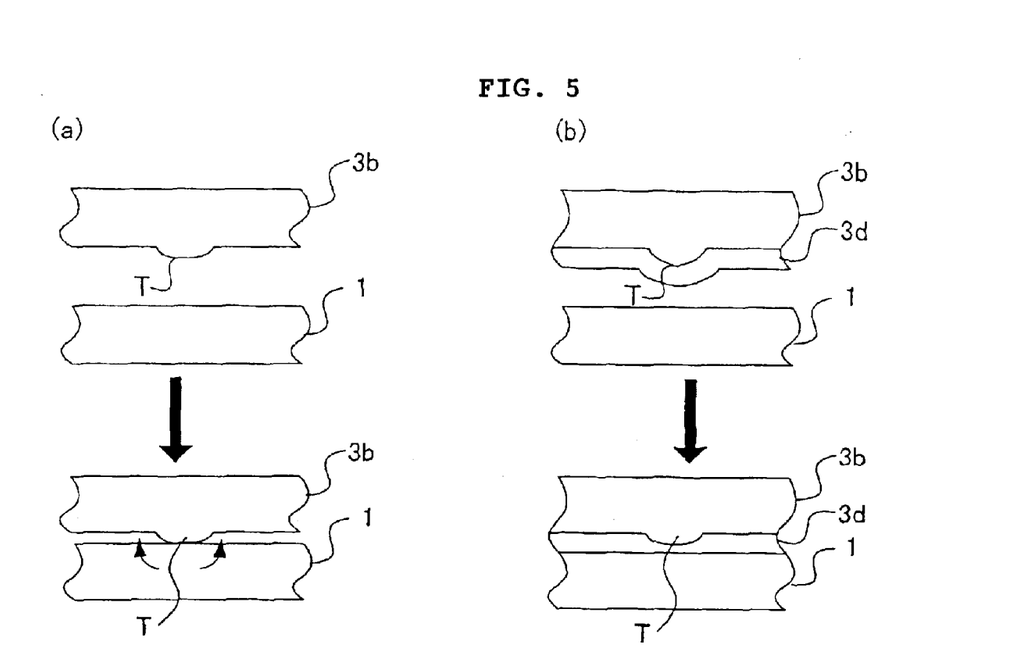
FIGS. 5A and 5B are views for explaining a reason for a warpage reduction according to the embodiment.

To begin with, a description will be made of the warpage reduction caused by reducing irregularities on the surface of the pressing portion 3b. FIGS. 5A and 5B are premised on an assumption that there is a local projection T on the pressing portion 3b of the top clamp 3. FIG. 5A shows a case of a pressing portion 3b of a top clamp 3 on which a coating layer 3d is not formed. On the other hand, FIG. 5B shows a case of a pressing portion 3b of a top clamp 3 on which a coating layer 3d is formed. Both of FIGS. 5A and 5B show parts of the pressing portions 3b in the vicinities of the surfaces thereof, respectively. In FIGS. 5A and 5B, an upper view shows a state in which the pressing portion 3b and the magnetic disk 1 are apart from each other, and a lower view shows a state in which the magnetic disk 1 is clamped with the pressing portion 3b.

As shown in FIG. 5A, in the case of the top clamp 3 on which the coating layer 3d is not formed, the projection T is brought into contact with the magnetic disk 1 locally. Accordingly, the magnetic disk 1 is about to be warped around a local portion where the magnetic disk 1 is in contact with the top clamp 3, in directions of dotted arrows in the drawing. On the other hand, in the case where the coating layer 3d is formed, as shown in FIG. 5B, deformation of the coating layer 3d is significant at the local portion of the projection T, thus absorbing the projection T. As a result, a contact interface between the coating layer 3d and the magnetic disk 1 has a high flatness. Accordingly, it is possible to reduce the warpage of the magnetic disk 1 which is caused by the local projection T.

Note that, if the surface of the coating layer 3d has a low flatness and if the surface of the coating layer 3d has pinholes, local irregularities exist on the coating layer 3d itself. Therefore, it is preferred that a material which has a high thickness accuracy and which generates less pinholes is used for the coating layer 3d. FEP can be said to be a coating material which also meets these requirements. Coating b described above has the thickness accuracy of +/−2 $\mu$m. Accordingly, Coating b is a more preferable coating layer 3d.

Figure 6:
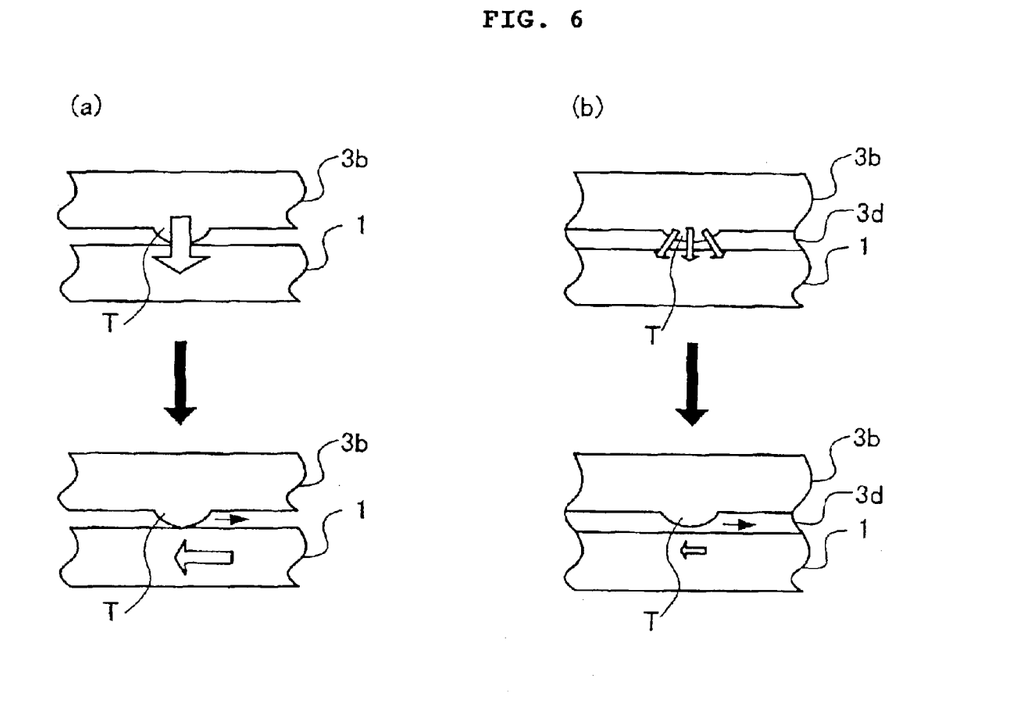
FIGS. 6A and 6B are views for explaining another reason for the warpage reduction according to the embodiment.

Next, referring to FIG. 6, a description will be made of the warpage reduction due to avoidance of stress concentration. Similarly to FIGS. 5A and 5B, FIG. 6A shows the case of the pressing portion 3b of the top clamp 3 on which the coating layer 3d is not formed. On the other hand, FIG. 6B shows the case of the pressing portion 3b of the top clamp 3 on which the coating layer 3d is formed.

As shown in FIG. 6A, in the case of the pressing portion 3b of the top clamp 3 on which the coating layer 3d is not formed, the projection T is brought into contact with the surface of the magnetic disk 1 locally. Thus, stresses concentrate at the contact portion. Since the top clamp 3 is fastened by use of the screw 4, a torque acts in a tightening direction (direction of a solid arrow) of the screw 4. In this case, since the stress concentration occurs, a frictional force which the projection T produces at the contact portion of the magnetic disk 1 is extremely large as shown by an outlined arrow. Accordingly, the warpage in a direction of a dotted arrow occurs in the magnetic disk 1. Note that, in the magnetic disk 1, the warpage is caused by a confluence of a number of factors as shown in FIGS. 5A and 6A.

Correspondingly, if the coating layer 3d is provided as shown in FIG. 6B, the stresses caused by the projection T are distributed through the coating layer 3d as shown by the outlined arrows. Therefore, on a contact surface between the coating layer 3d and the magnetic disk 1, the stress concentration does not occur as described in FIG. 6A. Coupled with the fact that the coating layer 3d is formed from FEP with the low friction coefficient, the friction force between the coating layer 3d and the magnetic disk 1 is reduced. As a result, occurrence of the warpage of a type shown in FIG. 6A is reduced.

From the above description, first, it can be seen that the coating layer 3d is required to be more pliable than the pressing portion 3b. Second, in order that effects thereof may be exerted sufficiently, it is preferred that the coating layer 3d has a low frictional property and is excellent in flatness and that a material which generates less pinholes is selected. It is needless to say that, as far as these requirements are satisfied, the coating layer 3d may be formed from a material other than FEP described in the embodiment.

Figure 7:
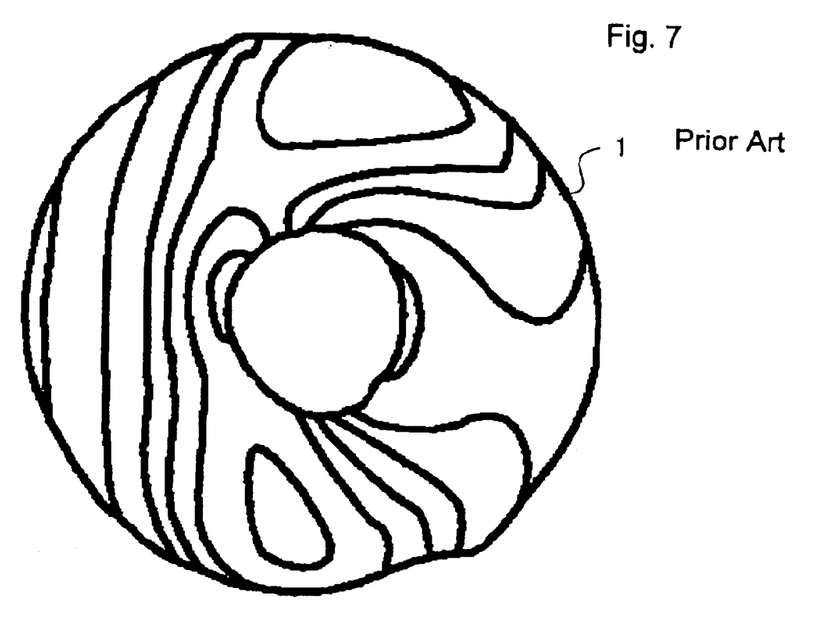
FIG. 7 is a contour map of a surface of the magnetic disk in a case where the magnetic disk is clamped with the top clamp on which the coating layer according to the embodiment is not formed.
Figure 8:
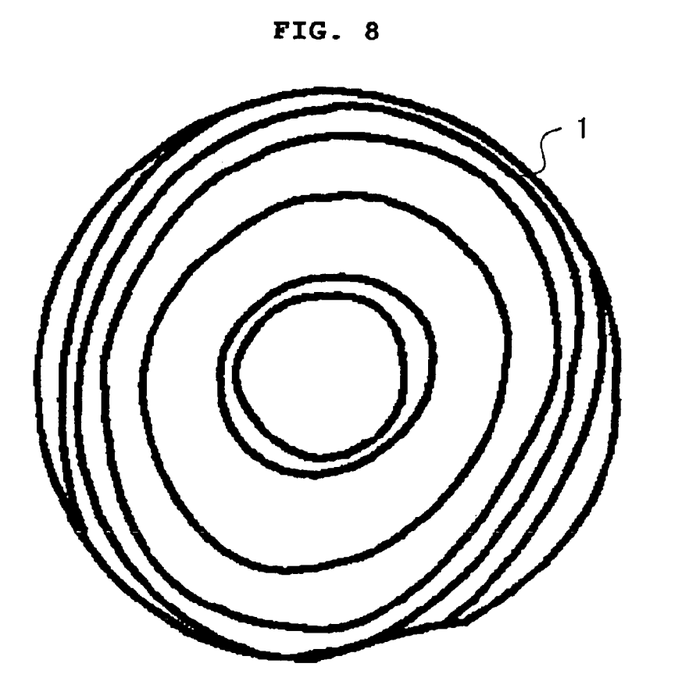
FIG. 8 is a contour map of the surface of the magnetic disk in a case where the magnetic disk is clamped with a top clamp on which the coating layer according to the embodiment is formed.

FIGS. 7 and 8 are contour maps of the surface of the magnetic disk 1, each of which shows the warpage in a case where the magnetic disk 1 is viewed as a plan view. If contour lines form round shapes and if intervals between the contour lines are equal to each other, the magnetic disk 1 is flat and there is no warpage.

In a case where the magnetic disk 1 is fastened with a top clamp 3 which has the factors of the warpage described with reference to FIGS. 5A and 6A, the warpage occurs throughout the magnetic disk 1 as shown in FIG. 7. On the other hand, in a case where the magnetic disk 1 is clamped with a top clamp 3 provided with a coating layer 3d similarly to the embodiment, the contour lines form almost round shapes and there is less warpage.

As described above, according to the present invention, it is possible to reduce warpage of a magnetic disk which is caused by tightening of a clamp.

Although the preferred embodiment of the present invention has been described in detail, it should be understood that various changes, substitutions and alternations can be made therein without departing from spirit and scope of the inventions as defined by the appended claims.

What is claimed is:

1. A disk drive device, comprising:
   a recording medium defining an axis of rotation having an axial direction;
   a head slider which has a head element for recording data on the recording medium and for reading data recorded on the recording medium;
   a spindle motor for rotationally driving the recording medium;
   a clamp for applying a pressing force to the recording medium to fasten the recording medium to the spindle motor, the clamp having an axial center, an attachment portion extending from the axial center that secures the clamp to the spindle motor, a pressing portion that applies force to the recording medium, and an elastic portion located between the attachment portion and the pressing portion, and the clamp being joined to the spindle motor with a single fastener that extends through the axial center of the clamp;
   a film body interposed between the pressing portion and the recording medium, the film body being formed from a material which is more pliable than a material forming the clamp, and the film body material having a lower coefficient of friction than the clamp material; and
   the attachment portion is located closer to the pressing portion in the axial direction than the elastic portion, such that the attachment portion, the elastic portion, and the pressing portion form a concave cross-sectional shape on both sides of the axial center of the clamp.

2. The disk drive device of claim 1, wherein the film body is adhered to the clamp and the elastic portion is circular.

3. The disk drive device of claim 1, wherein the film body is formed from fluorocarbon resin.

4. The disk drive device of claim 3, wherein the fluorocarbon resin contains fluorinated ethylene propylene copolymer (FEP).

5. A disk drive device, comprising:
   a recording medium defining an axis of rotation having an axial direction;
   a spindle motor for rotationally driving the recording medium which is mounted on a hub of the spindle motor;
   a clamp having an axial center and fastening the recording medium to the spindle motor with a single fastener extending through the axial center;

the clamp also having an attachment portion extending from the axial center, a circular elastic portion extending from the attachment portion for producing a predetermined elastic force, and a pressing portion for pressing the recording medium, the pressing portion being provided so as to extend from the elastic portion;

the attachment portion is located closer to the pressing portion in the axial direction than the elastic portion, such that the attachment portion, the elastic portion, and the pressing portion form a concave cross-sectional shape on both sides of the axial center of the clamp; and a coating layer containing fluorinated ethylene propylene copolymer (FEP) is formed on at least a surface of the pressing portion, the surface facing the recording medium.

6. The disk drive device of claim 5, wherein the recording medium includes a glass substrate surface and a magnetic thin film formed on the glass substrate surface.

7. The disk drive device of claim 6, wherein a thickness of the recording medium is less than or equal to 0.8 mm.

* * * * *